(12) United States Patent
Medina, III et al.

(10) Patent No.: US 11,836,697 B1
(45) Date of Patent: Dec. 5, 2023

(54) TRACKING AND GUIDANCE SYSTEM FOR RECURRING SERVICE MANAGEMENT

(71) Applicant: United Services Automobile Association (USAA), San Antonio, TX (US)

(72) Inventors: Reynaldo Medina, III, San Antonio, TX (US); William Preston Culbertson, II, San Antonio, TX (US); Susan Elizabeth Wright, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 52 days.

(21) Appl. No.: 16/916,396

(22) Filed: Jun. 30, 2020

(51) Int. Cl.
*G06Q 20/00* (2012.01)
*G06Q 20/22* (2012.01)
*G06F 16/23* (2019.01)

(52) U.S. Cl.
CPC ......... *G06Q 20/22* (2013.01); *G06F 16/2379* (2019.01)

(58) Field of Classification Search
CPC .................................................. G06Q 20/22
USPC ........................................................ 705/39
See application file for complete search history.

(56) References Cited

U.S. PATENT DOCUMENTS

| 2012/0078764 | A1* | 3/2012 | Ross | G06Q 30/04 705/35 |
| 2015/0088709 | A1* | 3/2015 | Mekala | G06Q 30/04 705/34 |
| 2017/0053358 | A1* | 2/2017 | Root-Scimeme | G06Q 10/1093 |
| 2020/0005259 | A1* | 1/2020 | Berger | G06Q 20/24 |

FOREIGN PATENT DOCUMENTS

CA        2832204 A1 * 11/2012 ............. G06Q 20/10

OTHER PUBLICATIONS

Authors: L. Richard Fischer: Legal Implication of Cashless Society; Publisher: IEEE; Published in: Computer ( vol. 6, Issue: 12, Dec. 1973) pp. 21-26: Date of Publication: Dec. 1973 (Year: 1973) (Year: 1973).*

(Continued)

*Primary Examiner* — Bruce I Ebersman
*Assistant Examiner* — Hatem M Ali
(74) *Attorney, Agent, or Firm* — Fletcher Yoder, P.C.

(57) ABSTRACT

A service tracking and guidance system includes processing circuitry configured to receive, from a location tracking device and/or an online service, usage data indicative of usage of a service by a consumer. The processing circuitry is also configured to determine a usage value based on the usage data, to receive remittance data indicative of recurring payments made by the consumer for the service, and to retrieve a usage threshold that represents a level of usage of the service that justifies the recurring payments. The processing circuitry is further configured to compare the usage value determined based on the usage data for a time period (Continued)

that corresponds to at least one of the recurring payments to the usage threshold and to provide an output with directions to increase the usage value or to facilitate cancellation of the service in response to the usage value being below the usage threshold.

11 Claims, 2 Drawing Sheets

(56) References Cited

OTHER PUBLICATIONS

Authors: Aussma Smiai et al.: Information and Communication Technology Research Opportunities in Dynamic Charging for Electric Vehicle; IEEE Conference Paper; IEEE Xplore; Publication Date: Aug. 1, 2015; Electronic Publication Date: Oct. 20, 2015; (Year: 2015) (Year: 2015).*

Authors: L. Richard Fischer: Legal Implication of Cashless Society; Publisher: IEEE; Published in: Computer ( vol. 6, Issue: 12, Dec. 1973) pp. 21-26: Date of Publication: Dec. 1973 (Year: 1973) (Year: 1973) (Year: 1973).*

Authors: Aussma Smiai et al.: Information and Communication Technology Research Opportunities in Dynamic Charging for Electric Vehicle; IEEE Conference Paper; IEEE Xplore; Publication Date: Aug. 1, 2015; Electronic Publication Date: Oct. 20, 2015; (Year: 2015) (Year: 2015) (Year: 2015).*

* cited by examiner

TRACKING AND GUIDANCE SYSTEM FOR RECURRING SERVICE MANAGEMENT

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A consumer may make recurring payments for various services, such as cable or streaming television services, mobile phone services, gym memberships, subscription-based shopping or food delivery services, or the like. In some cases, the consumer may set up automatic recurring payments for the various services, such as by providing information for a payment card so that providers of the various services can automatically charge and receive payments periodically (e.g., once per time period). Indeed, set up of automatic recurring payments may be required in order to access at least some of the various services. Generally, the automatic recurring payments may be beneficial to both the consumer and providers of the various services. For example, the automatic recurring payments reduce a number of steps (e.g., preparing a bill, sending the bill, reviewing the bill, inputting payment information) to complete payments for the various services.

SUMMARY

Certain embodiments commensurate in scope with the present disclosure are summarized below. These embodiments are not intended to limit the scope of the disclosure, but rather these embodiments are intended only to provide a brief summary of possible forms of present embodiments. Indeed, present embodiments may encompass a variety of forms that may be similar to or different from the embodiments set forth below.

In an embodiment, a service tracking and guidance system includes processing circuitry configured to receive, from a location tracking device and/or an online service, usage data indicative of usage of a service by a consumer. The processing circuitry is also configured to determine a usage value based on the usage data. The processing circuitry is further configured to receive, from a pecuniary database, remittance data indicative of recurring payments made by the consumer for the service. The processing circuitry is further configured to retrieve, from a guidance database, a usage threshold that represents a level of usage of the service that justifies the recurring payments. The processing circuitry is further configured to compare the usage value determined based on the usage data for a time period that corresponds to at least one of the recurring payments to the usage threshold. The processing circuitry is further configured to provide an output with directions to increase the usage value or to facilitate cancellation of the service in response to the usage value being below the usage threshold.

In an embodiment, a method of operating a service tracking and guidance system includes receiving, at processing circuitry, usage data indicative of usage of a service by multiple consumers over at least a first time period, a second time period, and a third time period. The method also includes determining, using the processing circuitry, a usage threshold based on the usage data over at least the first time period and the second time period. The method further includes determining, using the processing circuitry, a respective usage of the service by a first consumer of the multiple consumers over the third time period. The method further includes comparing, using the processing circuitry, the respective usage of the service by the first consumer to the usage threshold. The method further includes providing, via the processing circuitry, an output with directions to increase the usage or to facilitate cancellation of the service in response to the respective usage of the service by the first consumer being below the usage threshold.

In an embodiment, a tangible, non-transitory, machine-readable medium, includes machine readable instructions that, when executed by one or more processors of a machine, cause the machine to receive usage data indicative of usage of a service by multiple consumers over multiple time periods, determine a usage threshold based on the usage data, wherein the usage threshold represents an average usage by the multiple consumers per time period of the multiple time periods, compare a portion of the usage data indicative of a respective usage of the service by a first consumer of the multiple consumers over one of the time periods of the multiple time periods to the usage threshold, and provide an output with directions to facilitate cancellation of the service for the first consumer in response to the respective usage of the service by the first consumer being below the usage threshold.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As noted above, a consumer may make recurring payments for various services, such as cable or streaming television services, mobile phone services, gym memberships, subscription-based shopping or food delivery services, or the like. In some cases, the consumer may set up automatic recurring payments for the various services, such as by providing information for a payment card so that providers of the various services can automatically charge and receive payments periodically (e.g., once per time period). However, it is presently recognized that the consumer may continue to make the recurring payments or allow the automatic recurring payments to proceed even while the consumer does not frequently utilize the services. There may be many reasons for this, such as that the consumer does not recall each service for which they make automatic recurring payments, may not be aware of their usage of each service and/or whether their usage justifies a cost of the service, may not have time or may be distracted from carrying out steps needed to cancel the service, or the like.

With the foregoing in mind, embodiments of the present disclosure include a payment management system (e.g., recurring payment management system) that is configured to collect payment data indicative of recurring payments made by a consumer and usage data (e.g., location data) indicative of usage of services for which the consumer made the recurring payments. For one or more of the services (e.g., for each service), the payment management system is configured to match the payment data to the usage data. Furthermore, the payment management system is configured to analyze the payment data and the usage data to determine whether the usage of the service is sufficient to justify the recurring payment for the service. Then, the payment management system may provide an output, such as a notification to the consumer or an instruction (e.g., to a provider of the service) to cancel the service.

In some embodiments, the payment management system may also encourage activity that increases a value of the recurring payments to the consumer. This may start with identifying the recurring payments and the service with which the recurring payments are associated. As a specific example, present embodiments may operate to identify a recurring payment by detecting withdrawals from an account at regular intervals or substantially regular intervals, wherein the withdrawals are in substantially the same amount and/or directed to the same entity. Once identified, additional information may be obtained and usage may be tracked. For example, a regular payment to a gym may be identified as corresponding to a recurring payment associated with a gym membership. Present embodiments may then identify a physical location of the gym or locations of facilities associated with the gym. Further, present embodiments may include features that enable tracking of a consumer's location by monitoring a portable device (e.g., a smart phone). Using mapping or location data overlap between the consumer and the gym (or associated locations), present embodiments may identify whether the consumer is actually utilizing or receiving services from the gym. Further, present embodiments may provide correlations between the amount of usage and the amount of the recurring payment to provide guidance to the consumer with respect a ratio of usage and expense. For example, this usage data and payment data may suggest that canceling the gym membership will save money and that no value is being lost because the gym is not being utilized enough. Additionally, present embodiments may utilize the location data to encourage usage of services (e.g., a gym membership) to increase the value of the recurring payment. For example, present embodiments may notify a consumer of being in physical proximity to a gym during a travel routine of the consumer and indicate that using the gym will increase the value of the consumer's recurring payment.

Figure 1:
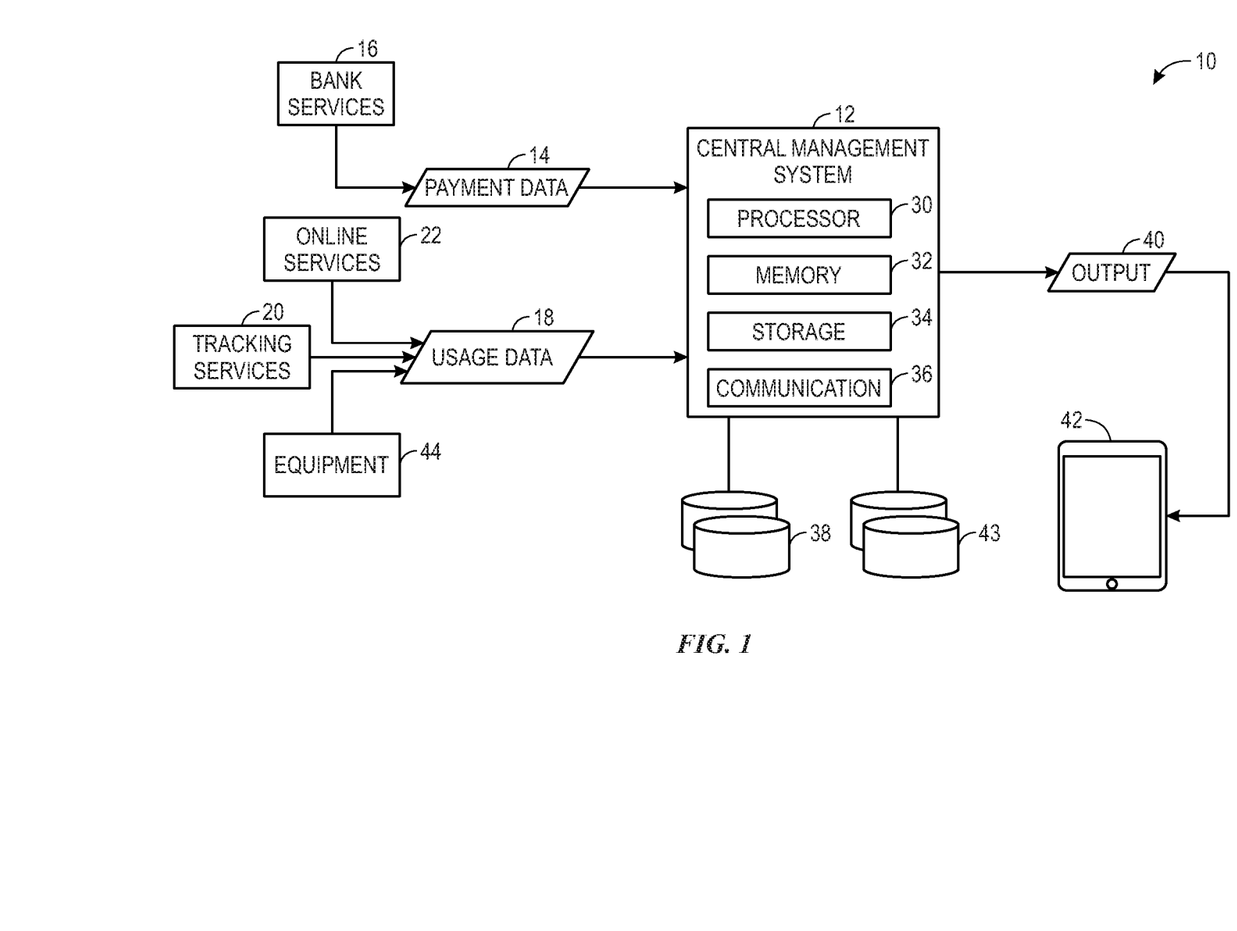
FIG. 1 is a schematic diagram of a payment management system that may be used to manage recurring payments, in accordance with an embodiment of the present disclosure.

With the foregoing in mind, FIG. 1 is a schematic diagram of a payment management system 10 (e.g., recurring payment management system) that may be used to manage recurring payments, in accordance with an embodiment of the present disclosure. As shown, the payment management system 10 may include a central management system 12 that intakes payment data 14 (e.g., remittance data), such as from bank services 16 (e.g., pecuniary database, banking accounts, payment card accounts) and/or from other suitable sources (e.g., input by the consumer via a budgeting application). The central management system 12 may also intake usage data 18 (e.g., location data) from one or more tracking devices 20 (e.g., sensors; global positioning system [GPS] receivers), online services 22 (e.g., via an application programming interface [API] corresponding to each online service), and/or from other suitable sources (e.g., input by the consumer via the budgeting application). The central management system 12 may include a processor 30, a memory device 32, a storage device 34, a communication device 36, and/or any other suitable components to carry out the techniques disclosed herein. In some embodiments, the central management system 12 may be configured to store data (e.g., the payment data 14, the usage data 18) in and/or access data from one or more databases 38 (e.g., guidance databases), which may be considered to be part of the central management system 12 (e.g., in the memory device 32 and/or the storage device 34) or communicatively coupled to the central management system 12.

The central management system 12 may be configured to provide an output 40, such as to a personal device 42 (e.g., mobile phone, personal computer) of the consumer. In such cases, the output 40 may include a map with directional guidance, an informative graphic (e.g., a chart), and/or text message on a graphical user interface (GUI) that may be visualized by the consumer. For example, a text message may be provided that indicates one or more services are recommended to be cancelled because the usage data does not justify the recurring payment. The central management system 12 may be configured to additionally or alternatively provide another type of output 40, such as an instruction to a provider (e.g., via interaction with the provider, such as through a website, an email message, or a phone call), to cancel the service. As another example, a map with directional guidance to a service provider location may be provided with a suggestion to visit the service provider location in order to increase a value of the recurring payment for the purposes of the consumer. To provide such information, the central management system 12 may include (e.g., in the memory device 32 and/or the storage device 34) or may be communicatively coupled to a map database 43 that allows coordination with the location information for the consumer (included in the usage data 18) based on, for example, the location of the personal device 42 of the consumer. The map database 43 may include map information, such as the service provider location(s) for various service providers.

The payment management system 10 may be configured to manage recurring payments for a wide variety of services, such as cable or streaming television services, mobile phone services, gym memberships, subscription-based shopping or food delivery services, or the like. Upon receipt of the payment data 14, the central management system 12 may mine the payment data 14 to identify recurring payments (e.g., that occur periodically, such as weekly, monthly, yearly; one payment per time period) made by the consumer. The central management system 12 may identify the recurring payments based on analysis of the payment data 14 (e.g., based on the payments occurring periodically over time). Present embodiments may include algorithms that identify periodic activity including regularly and substantially regularly occurring payments (e.g., withdrawals from an account). Additionally or alternatively, the recurring payments may be identified in other ways, such as via input by the consumer (e.g., using the personal device 42) and/or via identification (e.g., via keyword matching) of a name associated with a provider known to require recurring payments in banking records of the consumer, for example.

The central management system 12 may receive the usage data 18 directly from the personal device 42 and/or from one or more online services 22, and the central management system 12 may identify the usage data 18 that is for the consumer (e.g., based on a unique identifier associated with and received with the usage data 18). For example, the usage data 18 from a streaming television service for which the consumer makes a recurring payment may indicate that the consumer utilized the streaming television service for 20 hours during a time period. As another example, the usage data 18 from a subscription-based shopping service for which the consumer makes a recurring payment may indicate that the consumer utilized the subscription-based shopping service to place two orders during a time period. In some embodiments, the central management system 12 may receive the usage data 18 from one or more tracking devices 20 associated with the consumer (e.g., via a registration process). For example, the usage data 18 from a GPS receiver (e.g., in the personal device 42 of the consumer) may indicate that the consumer was at a location of a gym for which the consumer makes a recurring payment for 30 hours during a time period.

In the above examples, the usage data 18 generally relates to usage of the service for which the consumer makes a recurring payment; however, the usage data 18 may additionally or alternatively relate to usage of equipment 44 (e.g., an item, such as exercise equipment or a car) for which the consumer makes a recurring payment. For example, the usage data 18 from an exercise sharing or reporting service (e.g., for which there is a recurring payment or a free service) may indicate that a piece of exercise equipment (e.g., for which there is a recurring payment, such as a loan payment) was used for 10 hours during a time period.

The central management system 12 may link or correlate the payment data 14 (e.g., per time period) and the usage data 18 (e.g., per time period). With reference to the examples noted above, the central management system 12 may link the payment data 14 and the usage data 18 for the streaming television service, may link the payment data 14 and the usage data 18 for the subscription-based shopping service, may link the payment data and the usage data 18 for the gym membership, and may link the payment data 14 and the usage data 18 for the exercise sharing or reporting service and/or the piece of exercise equipment. Thus, the central management system 12 may link or correlate the payment data 14 and the usage data 18 for multiple different services (and/or items) for which the consumer makes recurring payments.

The central management system 12 may identify and/or classify the service (e.g., type of service, quality of service) based on the payment data 14 (e.g., a name of the provider; a first price paid to a provider indicates a first service, such as a premium subscription, while a second price paid to the provider indicates a second service, such as a regular subscription) and/or other inputs (e.g., as input by the consumer; via the online services 22). Furthermore, the usage (e.g., usage value) may be calculated and/or stored based on a time period, such as a number of hours per time period or a number of orders per time period, for example. Or the usage may be calculated and/or stored based on an amount paid per time period, such as a number of hours per dollar per time period or a number of orders per dollar per time period, for example.

It should be appreciated that any of a variety of tracking devices 20 may be utilized as part of the payment management system 10. The tracking devices 20 may include the GPS receiver that monitors and provides an indication of the consumer's presence at various locations that correspond to providers of the services for which the consumer makes recurring payments. The GPS receiver may monitor the consumer's presence at a gym, home (e.g., a primary residence or a second home) or office space for which the consumer makes recurring payments (e.g., mortgage payments, rent payments, utility payments, home owner's association payments), or the like. In such cases, the consumer may register the personal device 42 and/or enable location services of the personal device 42 to provide location data, which can be processed to determine the usage data 18, to the central management system 12. In order to carry out such techniques, the central management system 12 may first be provided with and/or access the location of the gym, such as via input (e.g., via the personal device 42) and based on the name and/or billing information identified via the bank services 16, for example. Additionally, the tracking devices 20 may include one or more sensors, such as a sensor that monitors a sound indicative of use of an item (e.g., a television or other electronic item; exercise equipment) of the consumer for which usage can be tracked, for example. Based on a duration of the sensor data (e.g., sounds), the central management system 12 may determine the usage of the item and set the usage data 18 for the item. In such cases, the consumer may register or otherwise enable the one or more sensors to provide sensor data to the central management system 12.

In order to determine whether the usage of the service justifies the recurring payment for the service, the central management system 12 may access a usage threshold (e.g., from the one or more databases 38) for the service, and then compare the usage based on the usage data 18 to the usage threshold. In response to the usage data 18 indicating that the usage by the consumer is less than the usage threshold, the central management system 12 may provide the output 40. For example, the central management system 12 may provide the output 40 via the personal device 42 to notify the consumer that the usage of the service does not justify the recurring payment and/or that it is recommended to cancel the service based on insufficient usage.

The usage threshold may be established in any of a variety of ways and may generally represent a level of usage (e.g., hours, orders) that justify the recurring payment (e.g., an acceptable ratio of the level of usage to an amount of the recurring payment). To facilitate discussion, the example of the usage threshold are described with reference to a usage per time period (e.g., a number of hours per time period or a number of orders per time period) for a particular service (e.g., as identified and classified by the central management system 12, such as an amount paid per time period based on the payment data 14). It should be appreciated that the usage threshold may represent a usage per amount paid per time period (e.g., a number of hours per dollar per time period or a number of orders per dollar per time period) for the particular service.

In some embodiments, the usage threshold may be set by the consumer, such as during a registration process and/or at any time. For example, the consumer may wish to receive the notification if their usage of the service does not exceed a certain usage threshold, such as 25 hours per month of usage of a streaming television service or five orders through a subscription-based shopping service. In some embodiments, the usage threshold may be determined by the central management system 12, such as based on an average usage for all consumers of the service or based on a percentage of the average usage for all consumers of the service. For example, if the average usage of all consumers is 50 hours per time period, then the usage threshold may be set to 50 hours per time period or 50 percent of this (i.e., 25 hours). In cases in which the usage threshold is set by the central management system 12, the consumer may be given the option to adjust the usage threshold (e.g., via an input using the personal device 42). The average usage may be an average usage over a current time period or over one or more prior time periods.

In some embodiments, the usage threshold may vary based on one or more characteristics of the consumer, such as an age, an amount of debt held by the consumer, an amount of savings held by the consumer (e.g., cash savings or net worth), and/or a household income for the consumer. The one or more characteristics may be obtained via a registration process by the consumer and/or via the bank services 16. For example, the usage threshold may be set to a lower usage (e.g., of hours or orders) for a first consumer with a first amount of debt and/or a first amount of savings, and the usage threshold may be set to a higher usage (e.g., higher than the lower usage) for a second consumer with a second amount of debt that is greater than the first amount of debt and/or a second amount of savings that is less than the first amount of savings. In this way, the payment management system 10 may encourage consumers with greater debt and/or less savings to cancel a recurring payment unless their use of the service is substantial (e.g., average or above average). As a more specific example, if the average usage of all consumers is 50 hours per time period, then the usage threshold may be set to less than 50 hours for the first consumer, and the usage threshold may be set to greater than 50 hours for the second consumer.

Similarly, the usage threshold may be set to a lower usage (e.g., of hours or orders) for a first consumer with a first household income, and the usage threshold may be set to a higher usage (e.g., higher than the lower usage) for a second consumer with a second household income that is less than the first household income. Or, the usage threshold may be set to a lower usage (e.g., of hours or orders) for a first consumer of a first age, and the usage threshold may be set to a higher usage (e.g., higher than the lower usage) for a second consumer of a second age that is less than the first age to encourage those closer to retirement to save, for example. The central management system 12 may employ one or more algorithms to set the usage threshold in this manner, and the usage threshold may vary gradually or continuously based on variations in the characteristic(s) to thereby generate a unique, or substantially unique, usage threshold for the consumer. It should be appreciated that other variations in the usage threshold based on the one or more characteristics are envisioned.

In some embodiments, the usage threshold may vary based on the one or more characteristics, but may be determined in a different way. For example, the consumers that utilize the service may be divided into sets based on the one or more characteristics (e.g., a first set of all consumers with an amount of savings over $50,000 and with a household income between $60,000-70,000, a second set of all consumers with an amount of savings over $50,000 and with a household income between $70,000-$80,000, and so on). The central management system 12 may be configured to determine the usage threshold for each set of the consumers (e.g., unique to each set; applied to each consumer within the set). For example, the central management system 12 may determine an average usage for each set of the consumers, and then set the usage threshold to be the average usage or set the usage threshold based on a percentage of the average usage for the set of the consumers. Furthermore, the percentage of the average usage that is used to determine the usage threshold may vary between the different sets of the consumers. For example, if the average usage for the first set is 50 hours, then the usage threshold may be set to 50 hours. However, if the average usage of the second set is 25 hours, then the usage threshold may be set to 12.5 hours. The central management system 12 may employ one or more algorithms to set the usage threshold in this manner, and the usage threshold may vary based on variations in the characteristic(s) to thereby generate a unique, or substantially unique, usage threshold for each set of the consumers.

In some embodiments, the usage threshold may be based on prior behaviors or trends in the usage data 18 for the consumer. More particularly, the usage threshold may be based on the usage by the consumer over multiple time periods (e.g., over multiple recurring payments; rolling time window; initial time period after initiating the service). For example, the usage threshold may be set based on an average usage for the consumer over the multiple time periods (e.g., to the average usage or a percentage of the average usage). In this way, the central management system 12 may detect and notify the consumer of a decrease in usage as compared to prior levels of usage.

The usage threshold may be assigned to a type of service and/or be set as the usage per an amount of the recurring payment (e.g., hours per dollar). For example, the usage threshold for some or all streaming television services may be set to a one hour per one dollar per time period, while the usage threshold for some or all gym memberships may be set to 30 minutes per one dollar per time period. In some embodiments, the usage history of the consumer or other consumers may not be utilized to establish the usage threshold. In some embodiments, the usage threshold may be set based on the average (or percentage of the average), and the usage per amount per time period may be used as a limit (e.g., to set a minimum or maximum usage threshold) for the usage threshold. Indeed, the various techniques to set the usage threshold or to otherwise evaluate whether the usage of the consumer is sufficient for the amount of the payment may be used in any combination.

Regardless of the manner in which the usage threshold is set, the output 40 (e.g., with the recommendation to cancel or instructions to cancel) may be provided in response to the usage falling below the usage threshold over the time period. It should be appreciated that the output 40 may be provided at the end of the time period (e.g., same day or after) or prior to a next recurring payment (e.g., 1, 2, 3, or more days prior), which may typically occur at the end of the time period, to thereby enable cancellation prior to the next recurring payment. If prior to the next recurring payment and prior to the end of the time period, the usage may not include the usage over an entirety of the time period, but may be close enough to the usage over the entirety of the time period to be useful and/or the usage threshold may be adjusted to account for this (e.g., the usage over a percentage, such as 90 percent, of the time period falls below the percentage of the usage threshold).

In any case, the output 40 may include information to facilitate cancellation of the service by the consumer, such as instructions for how to cancel the service, a link that the consumer may select to view a cancellation request form on a website of the provider of the service, a phone number of the provider of the service for the consumer to call to cancel the service, or the like. It should be appreciated that the cancellation may include a downgrade of the service (e.g., switch to a lower cost service from the same provider or a different provider). In such cases, the central management system 12 may determine the downgrade (e.g., one or more options for the downgrade), and the notification may include information to facilitate the downgrade. In such cases, the notification to the consumer may include options for the downgrade, as well as associated costs, instructions for how to complete the downgrade, a link that the consumer may use to complete the downgrade, or the like. The central management system 12 may be able to access (e.g., via the online service 22) information about the process for cancellation to provide such details in the notification. It should be appreciated that the central management system 12 may also be able to access information about reinstatement of the service (e.g., after cancellation), and the central management system 12 may provide the information about reinstatement as part of the notification.

In some embodiments, the output 40 may include an automated step (e.g., performed by the central management system 12) to cancel the service. For example, the central management system 12 may provide instructions to the provider of the service to cancel the service on behalf of the consumer. The central management system 12 may access information related to a process for cancellation of the service, and then the central management system may proceed to provide the instructions in accordance with the process, such as by generating an email to the provider to request cancellation, initiating a phone call with an automated message to request cancellation, or the like. Where the cancellation includes a downgrade of the service, the central management system 12 may carry out similar steps to complete the downgrade.

The automated cancellation may be particularly appropriate in cases in which the consumer has not utilized the service at all, or very minimally (e.g., near zero hours; less than or equal to about 5, 10, or 15 percent of the usage threshold). The central management system 12 may be able to access information about the process for cancellation, downgrade, and/or reinstatement of the service, and the central management system 12 may analyze the information and proceed with the automated cancellation upon determination that the cancellation, downgrade, and/or reinstatement of the service will not require additional costs to the consumer. Furthermore, it should be appreciated that the notification and the automated cancellation may be carried out together, such as by providing the notification to the consumer to recommend that the service be cancelled (or downgraded). Then, upon confirmation by the consumer (e.g., via an input with the personal device 42), the central management system 12 may proceed to cancel (or to downgrade) the service.

In an embodiment, the central management system 12 may not provide the output 40 in response to the usage falling below the usage threshold for only one time period, but may provide the output 40 in response to the usage falling below the usage threshold for a certain number of consecutive time periods (e.g., 1, 2, 3, or more time periods) or a certain number of time periods in a total time period (e.g., 2 out of 3 time periods, 6 out of 12 time periods). It should be appreciated that, in such cases, the number of time periods that trigger the output 40 may be input by the consumer, set by the central management system 12, and/or both (e.g., set by the central management system 12 and adjusted by the consumer).

One or more properties (e.g., audible tone, color, font size, font type, information presented) of the notification may change based on a difference between the usage of the consumer and the usage threshold over the time period and/or based on a number of time periods that the usage of the consumer has fallen below the usage threshold. For example, for a first difference, the notification may be presented in a first color (e.g., black text), and for a second difference greater than the first difference, the notification may be presented in a second color (e.g., red text).

Furthermore, for the first difference, the notification may be provided to facilitate cancellation by the consumer; however, for the second difference, the central management system 12 may proceed with automated cancellation on behalf of the consumer. Such automated cancellation may be particularly appropriate in cases in which the consumer has not utilized the service at all for one or more time periods, or very minimally (e.g., near zero hours; less than or equal to about 5, 10, or 15 percent of the usage threshold). The central management system 12 may further be able to access (e.g., via the online service 22) information about the process for cancellation, downgrade, and/or reinstatement of the service, and the central management system 12 may analyze the information and proceed with the automated cancellation upon determination that the cancellation, downgrade, and/or reinstatement of the service will not result in additional costs to the consumer. Should such additional costs be identified, the central management system 12 may provide the notification to the consumer instead.

In some embodiments, the output 40 may include directions to increase the usage of the service to meet the usage threshold. In some cases, the directions may include a map that shows a physical location(s) associated with the service (e.g., gyms accessible given the gym membership of the consumer; physical location(s) that the consumer may visit to use the service) for which the consumer makes the recurring payments. For example, the physical location of the consumer may be tracked (e.g., via the personal device 42) and the physical location(s) associated with the service may be retrieved from the map database 43. Upon detected overlap, the central management system 12 may log usage of the service. However, upon detected proximity and/or upon the usage falling below the usage threshold (e.g., in a prior time period and/or in a portion of a current time period), the central management system 12 may provide the map and/or any other suitable recommendation to encourage use of the service. In some embodiments, the central management system 12 may track the consumer's location over time and recommend a time for the consumer to use the service (e.g., based on the consumer's location over the last two weeks that shows that the consumer is near the gym each evening, the central management system 12 may recommend that the consumer visit the gym in the evening). In this way, the central management system 12 may operate to increase a value of the recurring payment made by the consumer.

In some embodiments, the central management system 12 may monitor a response of the consumer to the output 40, such as whether the consumer proceeds to cancel the service in response to the notification and/or whether the consumer reinstates the service after the automated cancellation by the central management system 12. Then, the central management system 12 may adjust (e.g., modify, update) the usage threshold based on this feedback. For example, if the consumer rejects the notification without cancelling the streaming television service or reinstates the streaming television service shortly after the automated cancellation, the central management system 132 may increase the usage threshold (e.g., from 25 hours to 30 hours) and/or change the usage threshold that would result in the automated cancellation so as to avoid further ineffective and/or undesirable notifications/actions.

The central management system 12 may utilize various algorithms, which may include various machine learning algorithms, to carry out these techniques and to more accurately predict the usage threshold that is appropriate for the consumer (or consumers, such as the set of consumers) to accept cancellation of the service. As used herein, machine learning refers to algorithms and statistical models that computer systems use to perform a specific task without using explicit instructions, relying instead on patterns and inference. In particular, machine learning generates a mathematical model based on sample data, known as "training data", in order to make predictions or decisions without being explicitly programmed to perform the task.

The central management system 12 may also provide information related to a cost savings associated with the cancellation of the service. For example, the central management system 12 may calculate and notify the consumer of the cost savings over time (e.g., amount per month, per year, or more) that would be realized upon cancellation of the service. In some embodiments, the central management system 12 may recommend downgraded services or alternative services, as well as an associated cost savings that would be realized upon changing to the downgraded or alternative services. Furthermore, the central management system 12 may calculate and notify the consumer of an income amount that may be realized by cancellation of the service, such as money that would be received upon selling an item associated with or used in conjunction with the service that is recommended to be cancelled. For example, the central management system 12 may identify (e.g., via input by the consumer to the online services 22 to link the exercise equipment to the service or via input by the consumer during the registration process) exercise equipment that is associated with an exercise sharing or reporting service that is recommended to be cancelled. In some cases, the central management system 12 may access prices for similar exercise equipment, such as via the online services 22 (e.g., online selling platforms). The central management system 12 may determine an estimated selling price (e.g., based on an average or median price of the similar exercise equipment, and then may output the estimated selling price to the consumer (e.g., as part of the cost savings; as part of the notification). The central management system 12 may provide instructions to the consumer for how to sell the equipment, such as a link to the online services for selling the exercise equipment.

It should be noted that the processor 30 may be any type of computer processor or microprocessor capable of executing computer-executable code. Further, the processor 30 may be representative of or include multiple processors that are part of the central management system 12 and that may perform processing operations herein described. The memory device 32 and the storage device 34 may be any suitable article of manufacture that can serve to store processor-executable code, data, or the like. These articles of manufacture may represent computer-readable media (e.g., any suitable form of memory or storage) that may store the processor-executable code used by the processor 30 to perform the presently disclosed techniques. The memory device 32 and the storage device 34 may also store data, various software applications, and the like. It should be noted that non-transitory merely indicates that the media is tangible and not a signal. The communication device 36 may facilitate network communications (e.g., wired or wireless) with remote systems and devices, such as the bank services 16, the tracking devices 20, the online services 22, and the personal device 42.

It should be noted that the components described above with regard to the central management system 12 are exemplary components and these systems of the present disclosure may include additional or fewer components relative to what is shown. Additionally, as would be understood, it should be noted that the personal device 42 may include components similar those described as part of the central management system 12, such as a processor, a communication component, and a memory device. While certain operations are described as being performed by the central management system 12 to facilitate discussion, it should be appreciated that the operations may be divided in any suitable manner between the central management system 12 and any other suitable computing system having one or more processors. It should also be noted that aspects of the central management system 12 may include or work in conjunction with a cloud-based computing system, server, or the like. The central management system 12 may include circuitry or software that facilitates association of relevant data (e.g., payment data 14 and usage data 18) for data management purposes. For example, the payment data 14 may be linked with the usage data 18 as part of the storage process and to facilitate efficient retrieval for generating the output 40 or for any other purpose.

Figure 2:
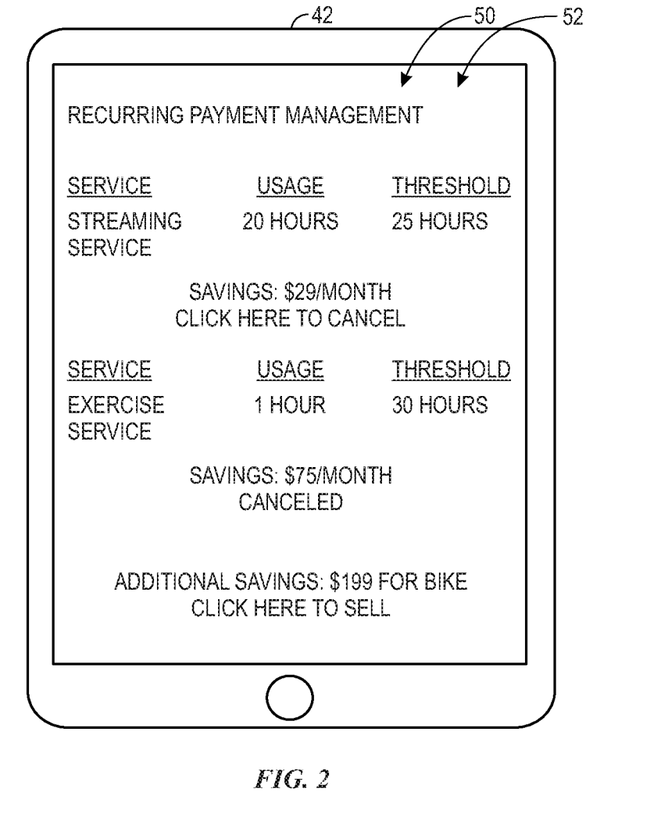
FIG. 2 is a schematic representation of a notification on a graphical user interface that may be presented by the payment management system of FIG. 1, in accordance with an embodiment of the present disclosure.

FIG. 2 is a schematic representation of a notification 50 on a graphical user interface (GUI) 52 that may be presented by the payment management system of FIG. 1, in accordance with an embodiment of the present disclosure. The GUI 52 may be displayed by the personal device 42, as shown. The notification 50 may include a table or list of service(s) that are recommended to be cancelled (e.g., based on analysis by the central management system 12). For example, the table may show the name of the service, the usage over the time period, and/or the usage threshold. The table may show a savings to be realized by cancellation of the service, as well as a link for the consumer to select to get more information about and/or to proceed with the cancellation of the service. For example, selection of the link may then enable presentation of a phone number or an email address that the consumer can utilize to contact the provider of the service.

In FIG. 2, one service is "Streaming Service," and the usage was 20 hours over the time period, and the usage threshold was 25 hours over the time period. Therefore, the usage was below the usage threshold, and the central management system 12 determined that the service should be cancelled due to insufficient usage. Another service is "Exercise Service," and the usage was 1 hour over the time period, and the usage threshold was 30 hours over the time period. Therefore, the usage was below the usage threshold, and the central management system 12 determined that the service should be cancelled due to insufficient usage. For each of the services, the cost savings per time period is presented. For the exercise service, the additional cost savings that would be realized upon sale of the exercise equipment that is used in conjunction with the exercise service is also displayed for visualization by the consumer. Links are provided to facilitate the cancellation and/or the sale.

The information included in the notification 50 is merely exemplary, and this information may be omitted and/or presented in a different manner. It should also be appreciated that different and/or additional information may be included in the notification 50, such as any additional fees that may be due upon cancellation, a date of a next recurring payment, downgrade options, or the like. The notification 50 may also include services for which the usage exceeded the usage threshold.

It should be appreciated that the notification 50 may include selectable features (e.g., icons) or links, and thus, the notification 50 may include features that essentially operate as a menu. For example, the consumer may select the hours of usage, and the consumer may then be presented with relevant information, such as the dates of the usage over the time period. Or the consumer may select the hours of the usage threshold, and the consumer may then be presented with details about the ways in which the usage threshold was determined (e.g., the one or more characteristics considered, the average of all consumers or of all consumers in the set, the percentage of the average used) and/or an option to adjust the usage threshold. The consumer may be able to update their characteristics and/or may also be able to select an option to accept and/or an option to reject the recommendation.

The notification 50 may include variations for any of the reasons noted above. For example, the text related to the Streaming Service may be presented in black font, while the text related to the Exercise Service may be presented in red font or otherwise highlighted. Furthermore, selection of the link to cancel the Streaming Service may prompt the consumer to carry out steps to cancel the service, while the Exercise Service has been automatically cancelled by the payment management system. These variations may be due to a greater difference between the usage and the usage threshold for the Exercise Service.

Figure 3:
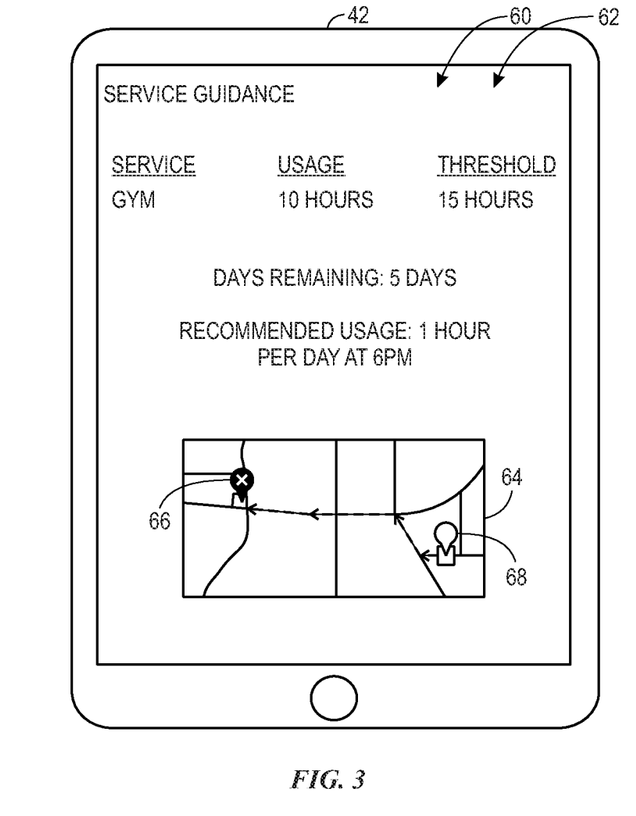
FIG. 3 is a schematic representation of a notification on a graphical user interface that may be presented by the payment management system of FIG. 1, wherein the notification includes a map and associated guidance, in accordance with an embodiment of the present disclosure.

FIG. 3 is a schematic representation of a notification 60 on a GUI 62 that may be presented by the payment management system of FIG. 1, in accordance with an embodiment of the present disclosure. The GUI 62 may be displayed by the personal device 42, as shown. The notification 60 may include a map 64 of a location(s) 66 at which the consumer may increase the usage of a service. For example, the map 64 may include the location 66 of a gym that the consumer may visit to increase the usage of a gym membership for which the consumer makes a recurring payment. The map 64 may include a current location 68 of the consumer or an anticipated or predicted location of the consumer at a particular time, as well as a route from the current location 68 or the predicted location to the location 66. In some embodiments, the predicted location of the consumer at a particular time may be the predicted location at a time at which the consumer is recommended to begin travel to the location 66 of the gym. The predicted location and the time may be based on the location data that indicates the location of the consumer over time (e.g., the prior month, the prior week), which may be processed to determine the time that the consumer is in proximity to the location 66 of the gym, the route that consumer took to be in proximity to the location 66 of the gym (e.g., a starting location and time), and/or other times and/or routes that the consumer took to use the services at the gym (e.g., as evidenced by the location data).

The notification 60 may include other data related to the map 64, such as the name of the service (e.g., "Gym"), the usage over the time period (e.g., 10 hours), and/or the usage threshold (e.g., 15 hours over the time period). In the illustrated example, the usage is below the usage threshold, and the central management system 12 determined that the consumer should be encouraged to increase the usage during the remainder of the time period to increase a value of the recurring payment. The notification 60 may also include a number of days remaining in the time period, as well as a recommended strategy or way to achieve the usage threshold to thereby realize an adequate amount of value for the recurring payment. For example, in the illustrated example, the recommendation may include one hour of usage per day for the remaining five days in the time period. The recommendation may also include a suggested time to achieve the usage, which may be based on the location data that indicates the location of the consumer over time (e.g., the prior month, the prior week). It should be appreciated that the map 64 and the other data related to the map 64 may be based on the usage over a prior time period. For example, the consumer may be encouraged to use the service if the usage of the service over the prior time period was below the usage threshold (e.g., to make up for the value lost over the prior time period and/or to prevent another low-value time period).

The information included in the notification 60 is merely exemplary, and this information may be omitted and/or presented in a different manner. It should also be appreciated that different and/or additional information may be included in the notification 60, such as a date of a next recurring payment, downgrade options, or the like. It should be appreciated that the notification 60 may include selectable features (e.g., icons) or links, and thus, the notification 60 may include features that essentially operate as a menu. For example, the consumer may select the hours of usage, and the consumer may then be presented with relevant information, such as the dates of the usage over the time period. Or the consumer may select the hours of the usage threshold, and the consumer may then be presented with details about the ways in which the usage threshold was determined (e.g., the one or more characteristics considered, the average of all consumers or of all consumers in the set, the percentage of the average used) and/or an option to adjust the usage threshold. The consumer may be able to update their characteristics and/or may also be able to select an option to accept and/or an option to reject the recommendation. The notification 60 may include variations for any of the reasons noted above.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A service tracking and guidance system, comprising: processing circuitry configured to:
   receive, from a location tracking device, usage data indicative of usage of a service by a consumer, wherein the usage of the service comprises an amount of time spent at a location;
   determine a usage value based on the usage data;
   receive, from a pecuniary database, remittance data indicative of recurring payments by the consumer for the service;
   determine an average usage threshold, wherein the average usage threshold corresponds to an average usage of the service by a plurality of other consumers over a time period that corresponds to at least one of the recurring payments, over another time period prior to the time period, or both;
   determine and continuously update a usage threshold by adjusting the average usage threshold based on one or more characteristics of the consumer, wherein the usage threshold comprises a threshold amount of time and represents a level of usage of the service that indicates that the consumer has derived value from the service relative to the plurality of other consumers and accounts for the one or more characteristics of the consumer, wherein the one or more characteristics comprise a savings amount, a debt amount, a household income, or any combination thereof;
   compare the usage value determined based on the usage data for the time period that corresponds to at least one of the recurring payments to the usage threshold;
   provide an output that comprises a notification on a graphical user interface for visualization by the consumer, the notification comprises a map of the location associated with the service, and the notification comprises directions to increase the usage value or to facilitate cancellation of the service in response to the usage value being below the usage threshold; and
   monitor a response of the consumer following the output, and determine and continuously update the usage threshold based on the consumer failing to cancel the service or reinstating the service after the cancellation.

2. The service tracking and guidance system of claim 1, wherein the processing circuitry is configured to enable the consumer to adjust the usage threshold via an input.

3. The service tracking and guidance system of claim 1, wherein the processing circuitry is configured to continuously update the usage threshold for the consumer in response to changes in the one or more characteristics of the consumer.

4. The service tracking and guidance system of claim 1, wherein the usage threshold accounts for the savings amount, the debt amount, and the household income of the consumer.

5. The service tracking and guidance system of claim 1, wherein the notification comprises the usage value and the usage threshold.

6. A method of operating a service tracking and guidance system, the method comprising:
   receiving, at processing circuitry and from one or more location tracking devices, usage data indicative of usage of a service by a plurality of consumers over at least a first time period, wherein the usage of the service comprises a respective amount of time spent by each of the plurality of consumers at a location over at least the first time period;
   determining, using the processing circuitry, an average usage threshold, wherein the average usage threshold corresponds to an average usage of the service by the plurality of consumers over at least the first time period;
   determining and continuously updating, using the processing circuitry, a usage threshold by adjusting the average usage threshold based on one or more characteristics of a first consumer of the plurality of consumers, wherein the usage threshold comprises a threshold amount of time and represents a level of usage of the service per time period that indicates that the first consumer has derived value from the service relative to other consumers of the plurality of consumers and accounts for the one or more characteristics of the first consumer, wherein the one or more characteristics comprise a savings amount, a debt amount, a household income, or any combination thereof;
   determining, using the processing circuitry, a respective usage of the service by the first consumer over the first time period;
   comparing, using the processing circuitry, the respective usage of the service by the first consumer to the usage threshold;
   determining that the first consumer has not derived value from the service relative to the other consumers in response to the respective usage of the service by the first consumer being below the usage threshold;
   providing, via the processing circuitry, an output that comprises a notification on a graphical user interface for visualization by the first consumer, the notification comprises a map of the location associated with the service, and the notification comprises directions to increase the usage or to facilitate cancellation of the service in response to determining that the first consumer has not derived value from the service relative to the other consumers; and
   monitoring, via the processing circuitry, a response of the first consumer following the output, and determining and continuously updating the usage threshold based on the first consumer failing to cancel the service or reinstating the service after the cancellation.

7. The method of claim 6, wherein the usage threshold is based on a percentage of the average usage threshold.

8. The method of claim 6, comprising determining and continuously updating, using the processing circuitry, the usage threshold based on one or more respective characteristics of each of the other consumers of the plurality of consumers.

9. A tangible, non-transitory, machine-readable medium, comprising machine readable instructions that, when executed by one or more processors of a machine, cause the machine to:
- receive usage data from one or more location tracking devices, wherein the usage data is indicative of usage of a service by a plurality of consumers over a plurality of time periods, and the usage of the service comprises a respective amount of time spent by each of the plurality of consumers at a location over the plurality of time periods;
- determine an average usage threshold, wherein the average usage threshold corresponds to an average usage of the service by the plurality of consumers over a time period of the plurality of time periods, over another time period prior to the time period, or both;
- determine and continuously update a usage threshold by adjusting the average usage threshold based on one or more characteristics of a first consumer of the plurality of consumers, wherein the usage threshold comprises a threshold amount of time and represents a level of usage of the service that indicates that the first consumer has derived value from the service relative to other consumers of the plurality of consumers per time period over at least one of the plurality of time periods and accounts for the one or more characteristics of the plurality of consumers, wherein the one or more characteristics comprise a savings amount, a debt amount, a household income, or any combination thereof;
- determine that the first consumer has not derived value from the service relative to the other consumers in response to a portion of the usage data indicative of a respective usage of the service by the first consumer over one of the time periods of the plurality of time periods being below the usage threshold;
- provide an output that comprises a notification on a graphical user interface for visualization by the first consumer, the notification comprises a map of the location associated with the service, and the notification comprises directions to facilitate cancellation of the service for the first consumer in response to determining that the first consumer has not derived value from the service relative to the other consumers; and
- monitor a response of the first consumer following the output, and determine and continuously update the usage threshold based on the first consumer failing to cancel the service or reinstating the service after the cancellation.

10. The service tracking and guidance system of claim 1, wherein
the average usage threshold corresponds to the average usage of the service by the plurality of other consumers over the time period.

11. The service tracking and guidance system of claim 10, wherein the average usage of the service comprises an average amount of time of usage of the service.

* * * * *